(12) United States Patent
Sato et al.

(10) Patent No.: US 11,842,846 B2
(45) Date of Patent: Dec. 12, 2023

(54) LAMINATED ELECTRONIC COMPONENT (71) Applicant: Murata Manufacturing Co., Ltd., Kyoto-fu (JP)

(72) Inventors: Mitsuhiro Sato, Nagaokakyo (JP); Daisuke Takahashi, Nagaokakyo (JP); Ryohei Kawabata, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 856 days.

(21) Appl. No.: 16/592,522

(22) Filed: Oct. 3, 2019

(65) Prior Publication Data
US 2020/0111608 A1 Apr. 9, 2020

(30) Foreign Application Priority Data
Oct. 5, 2018 (JP) ................................ 2018-190193

(51) Int. Cl.
*H01F 41/04* (2006.01)
*H01F 17/00* (2006.01)
(Continued)

(52) U.S. Cl.
CPC ........... *H01F 41/046* (2013.01); *C04B 35/26* (2013.01); *H01F 17/0013* (2013.01); *H01F 17/04* (2013.01); *H01F 27/255* (2013.01); *H01F 27/292* (2013.01); *H01F 37/00* (2013.01); *C04B 2235/3281* (2013.01); *C04B 2235/5436* (2013.01); *C04B 2235/5445* (2013.01); *H01F 2017/0066* (2013.01)

(58) Field of Classification Search
CPC .... H01F 41/046; H01F 17/0013; H01F 17/04; H01F 27/255; H01F 27/292
See application file for complete search history.

(56) References Cited

U.S. PATENT DOCUMENTS

| 11,227,715 | B2 | 1/2022 | Hamada et al. |
| 2006/0071749 | A1 | 4/2006 | Aoki et al. |

(Continued)

FOREIGN PATENT DOCUMENTS

| CN | 105489341 A | 4/2016 |
| CN | 110098030 A | 8/2019 |

(Continued)

OTHER PUBLICATIONS

An Office Action; "Notice of Reasons for Refusal," mailed by the Japanese Patent Office dated Feb. 24, 2021, which corresponds to Japanese Patent Application No. 2018-190193 and is related to U.S. Appl. No. 16/592,522; with English language translation.

(Continued)

*Primary Examiner* — Marlon T Fletcher
*Assistant Examiner* — Malcolm Barnes
(74) *Attorney, Agent, or Firm* — Studebaker & Brackett PC (57) ABSTRACT

A laminated electronic component includes a body including a magnetic layer containing magnetic particles; a coil provided within the body; and outer electrodes provided on a bottom surface of the body and each electrically connected to any one of end portions of the coil. The coil is formed by connecting a plurality of coil conductors stacked within the body, and the body includes a non-magnetic layer present between one of the outer electrodes and one of the coil conductors opposing the one of the outer electrodes.

20 Claims, 7 Drawing Sheets

(51) Int. Cl.
*H01F 17/04* (2006.01)
*H01F 27/25* (2006.01)
*H01F 27/29* (2006.01)
*H01F 27/255* (2006.01)
*H01F 37/00* (2006.01)
*C04B 35/26* (2006.01)

(56) References Cited

U.S. PATENT DOCUMENTS

| | | | | |
|---|---|---|---|---|
| 2007/0030659 A1* | 2/2007 | Suzuki | ............... | H05K 1/165 336/200 |
| 2007/0085121 A1* | 4/2007 | Mikura | ............... | H05K 1/165 257/295 |
| 2009/0051474 A1* | 2/2009 | Lee | ............... | H01F 17/04 336/83 |
| 2009/0085711 A1* | 4/2009 | Iwasaki | ............... | H01F 17/04 336/234 |
| 2010/0033286 A1* | 2/2010 | Katayama | ............... | H01F 3/14 336/200 |
| 2011/0095856 A1* | 4/2011 | Nakajima | ............... | H01F 1/344 29/602.1 |
| 2012/0286917 A1* | 11/2012 | Uchida | ............... | H01F 41/041 336/200 |
| 2013/0257576 A1* | 10/2013 | Arata | ............... | H01F 17/0013 336/200 |
| 2013/0314194 A1* | 11/2013 | Sato | ............... | H01F 17/0013 336/200 |
| 2014/0176286 A1* | 6/2014 | Okada | ............... | H01F 17/0013 336/200 |
| 2015/0206643 A1* | 7/2015 | Yokoyama | ............... | H01F 3/14 336/221 |
| 2015/0332840 A1* | 11/2015 | Yazaki | ............... | H01F 27/2823 336/200 |
| 2015/0380151 A1 | 12/2015 | Choi | | |
| 2016/0078997 A1* | 3/2016 | Son | ............... | H01F 17/0013 174/260 |
| 2016/0099102 A1* | 4/2016 | Matsunaga | ............... | H01F 17/0013 336/105 |
| 2016/0268038 A1 | 9/2016 | Choi | | |
| 2017/0125167 A1 | 5/2017 | Kawakami et al. | | |
| 2018/0019052 A1 | 1/2018 | Hashimoto et al. | | |
| 2018/0061561 A1* | 3/2018 | Sim | ............... | H01F 17/04 |
| 2018/0090255 A1* | 3/2018 | Noguchi | ............... | H01F 27/292 |
| 2018/0122560 A1* | 5/2018 | Okuda | ............... | H01F 17/0013 |
| 2018/0123545 A1 | 5/2018 | Mizushima et al. | | |

FOREIGN PATENT DOCUMENTS

| | | |
|---|---|---|
| CN | 114628116 A | 6/2022 |
| DE | 10 2018 214 495 A1 | 2/2019 |
| DE | 10 2019 208 188 A1 | 1/2020 |
| JP | 2003-124028 A | 4/2003 |
| JP | 2005-209881 A | 8/2005 |
| JP | 2006-310777 A | 11/2006 |
| JP | 2009-16658 A | 1/2009 |
| JP | 2009016658 A * | 1/2009 |
| JP | 2012-160506 A | 8/2012 |
| JP | 2013-211302 A | 10/2013 |
| JP | 2014-003044 A | 1/2014 |
| JP | 2014-022426 A | 2/2014 |
| JP | 2016-051752 A | 4/2016 |
| JP | 5967288 B2 | 8/2016 |
| JP | 2016-186963 A | 10/2016 |
| JP | 2018-056197 A | 4/2018 |
| KR | 10-2018-0014593 A | 2/2018 |
| KR | 20180014593 A * | 2/2018 |
| WO | 2008/004633 A1 | 1/2008 |
| WO | 2009/130935 A1 | 10/2009 |
| WO | 2014/136342 A1 | 9/2014 |
| WO | 2018/143114 A1 | 8/2018 |

OTHER PUBLICATIONS

An Office Action; "Notice of Reasons for Refusal", mailed by the Japanese Patent Office dated Mar. 2, 2021, which corresponds to Japanese Patent Application No. 2018-190190 and is related to U.S. Appl. No. 16/592,522; with English language translation.

* cited by examiner

LAMINATED ELECTRONIC COMPONENT

CROSS-REFERENCE TO RELATED APPLICATION

This application claims benefit of priority to Japanese Patent Application No. 2018-190193, filed Oct. 5, 2018, the entire content of which is incorporated herein by reference.

BACKGROUND

Technical Field

The present disclosure relates to a laminated electronic component.

Background Art

Japanese Unexamined Patent Application Publication No. 2016-186963 describes a laminated electronic component in which magnetic layers and conductor patterns are laminated and the conductor patterns between the magnetic layers are connected to form a coil within a multilayer body, wherein the magnetic layers are formed from a metallic magnetic material and at least one extended conductor pattern of the coil is connected to an external terminal formed on a bottom surface of the multilayer body by a conductor formed at a corner of the multilayer body.

In the laminated electronic component described in Japanese Unexamined Patent Application Publication No. 2016-186963, the magnetic layer is formed from a metallic magnetic material. In the case where the magnetic layer contains a metallic magnetic material, leak may occur between an outer electrode and a coil conductor opposing the outer electrode.

SUMMARY

Accordingly, the present disclosure provides a laminated electronic component that is able to inhibit occurrence of leak between an outer electrode and a coil conductor opposing the outer electrode and that has high reliability.

The present inventors have found that, by providing a non-magnetic layer between an outer electrode and a coil conductor opposing the outer electrode, it is possible to inhibit occurrence of leak between the outer electrode and the coil conductor opposing the outer electrode. Accordingly, the present inventors have completed the present disclosure.

According to an aspect of the present disclosure, there is provided a laminated electronic component including a body including a magnetic layer containing magnetic particles; a coil provided within the body; and outer electrodes provided on a bottom surface of the body and each electrically connected to any one of end portions of the coil, in which the coil is formed by connecting a plurality of coil conductors stacked within the body, and the body includes a non-magnetic layer present between the outer electrode and the coil conductor opposing the outer electrode.

The laminated electronic component according to preferred embodiments of the present disclosure is able to inhibit occurrence of leak between the outer electrode and the coil conductor opposing the outer electrode and has high reliability, by having the above-described features.

Other features, elements, characteristics and advantages of the present disclosure will become more apparent from the following detailed description of preferred embodiments of the present disclosure with reference to the attached drawings.

DETAILED DESCRIPTION

Hereinafter, laminated electronic components according to embodiments of the present disclosure will be described in detail with reference to the drawings. It should be noted that the embodiments described below are intended to be illustrative, and the present disclosure is not limited to the embodiments described below. The dimensions, materials, shapes, relative arrangements, and the like of the components described below are not intended to limit the scope of the present disclosure to only them unless otherwise specified, and are merely illustrative examples. In addition, the sizes, shapes, positional relationship, and the like of the components shown in each drawing may be exaggerated for the sake of clarity.

First Embodiment

Figure 1A:
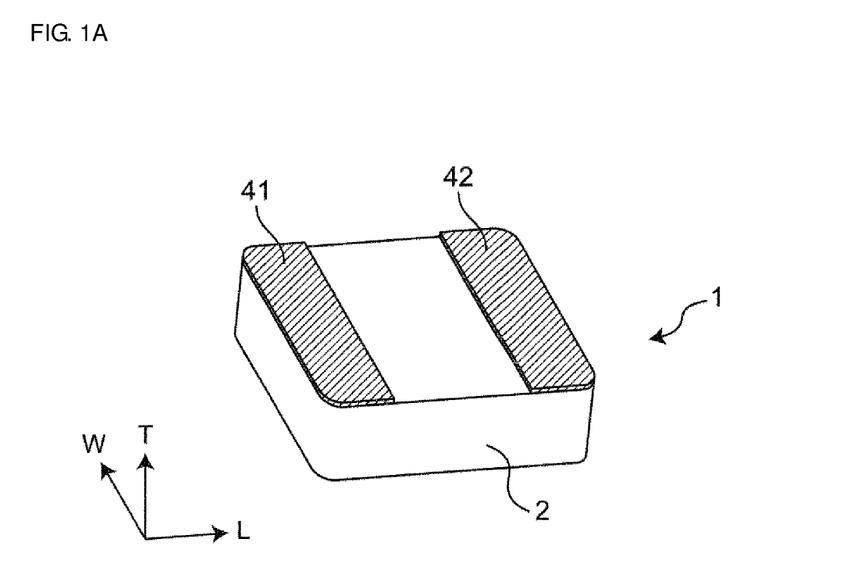
FIG. 1A is a perspective view of a laminated electronic component according to a first embodiment of the present disclosure, as seen from the bottom side.
Figure 1B:
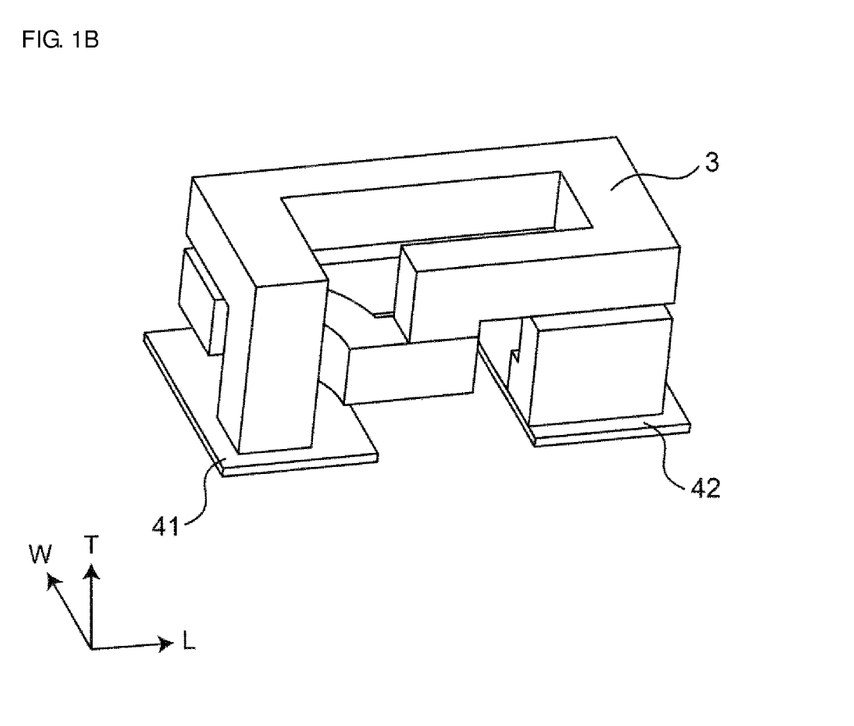
FIG. 1B is a perspective view schematically showing the shape of a coil provided within the laminated electronic component according to the first embodiment.

FIG. 1A and FIG. 1B show a laminated electronic component 1 according to a first embodiment of the present disclosure. FIG. 1A is a perspective view of the laminated electronic component 1 according to the first embodiment, as seen from the bottom side, and FIG. 1B is a perspective view schematically showing the shape of a coil 3 provided within the laminated electronic component 1 according to the first embodiment. The laminated electronic component 1 according to the present embodiment includes a body 2 including a magnetic layer containing magnetic particles; a coil 3 provided within the body 2; and outer electrodes 41 and 42 that are provided on a bottom surface of the body 2 and that are each electrically connected to any one of end portions of the coil 3. In the present specification, the lengths, the widths, and the thicknesses (heights) of the laminated electronic component 1 and the body 2 are sometimes referred to as "L", "W", and "T", respectively (see FIG. 1). In addition, in the present specification, a direction parallel to the length L of the body 2 is sometimes referred to as an "L direction", a direction parallel to the width W of the body 2 is sometimes referred to as a "W direction", a direction parallel to the thickness T of the body 2 is sometimes referred to as a "T direction", a plane parallel to the L direction and the T direction of the body 2 is sometimes referred to as an "LT surface", a plane parallel to the W direction and the T direction of the body 2 is sometimes referred to as a "WT surface", and a plane parallel to the L direction and the W direction of the body 2 is sometimes referred to as an "LW plane".

The size of the laminated electronic component 1 according to the present embodiment is not particularly limited. However, preferably, the length (L) is not less than about 0.57 mm and not greater than about 1.75 mm (i.e., from about 0.57 to about 1.75 mm), the width (W) is not less than about 0.27 mm and not greater than about 0.95 mm (i.e., from about 0.27 mm to about 0.95 mm), and the height (T) is not less than about 0.45 mm and not greater than about 1.20 mm (i.e., from about 0.45 mm to about 1.20 mm).

Figure 2:
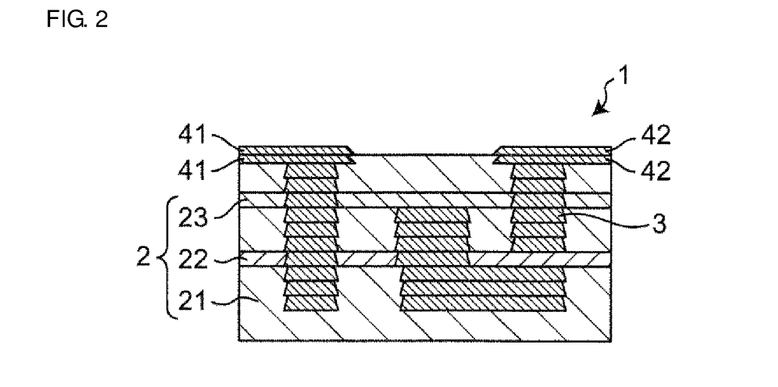
FIG. 2 is a cross-sectional view schematically showing the internal structure of the laminated electronic component according to the first embodiment.

FIG. 2 shows a cross-sectional view, parallel to the LT plane, of the laminated electronic component 1 according to the present embodiment. The cross-sectional views shown in FIG. 2 to FIG. 5C are cross-sectional views in which the bottom surface of the body 2 is located at the upper side. In the laminated electronic component 1 shown in FIG. 2, the body 2 includes a magnetic layer 21 and a non-magnetic layer 23. The body 2 may further include an additional non-magnetic layer 22, but the additional non-magnetic layer 22 is not essential.

(Magnetic Layer 21)

The magnetic layer 21 contains magnetic particles formed from a magnetic material. The magnetic particles may be particles of a metallic magnetic material (metallic magnetic particles) such as Fe, Co, Ni, and alloys containing these metals, or may be ferrite particles. The magnetic particles are preferably particles of Fe or particles of a Fe alloy. The Fe alloy is preferably a Fe—Si alloy, a Fe—Si—Cr alloy, a Fe—Si—Al alloy, a Fe—Si—B—P—Cu—C alloy, a Fe—Si—B—Nb—Cu alloy, or the like. The surfaces of the above-described metallic magnetic particles formed from the metallic magnetic material are preferably covered with an insulating coating. When the surfaces of the metallic magnetic particles are covered with an insulating coating, it is possible to enhance the insulation between the metallic magnetic particles. The method for forming the insulating coating on the surfaces of the metallic magnetic particles will be described later. The material forming the insulating coating is preferably an oxide of P, Si, or the like. In addition, the insulating coating may be an oxide film formed by oxidizing the surfaces of the metallic magnetic particles. The thickness of the insulating coating is preferably not less than about 1 nm and not greater than about 50 nm (i.e., from about 1 nm to about 50 nm), more preferably not less than about 1 nm and not greater than about 30 nm (i.e., from about 1 nm to about 30 nm), and further preferably not less than about 1 nm and not greater than about 20 nm (i.e., from about 1 nm to about 20 nm). The thickness of the insulating coating may be measured by photographing, with a scanning electron microscope (SEM), a cross-section obtained by grinding a sample of the laminated electronic component 1; and measuring the thickness of the insulating coating on the surface of the metallic magnetic particle from the obtained SEM photograph, as described later.

The average particle size of the metallic magnetic particles in the magnetic layer 21 may be measured by a procedure described below. For a cross-section obtained by cutting a sample of the laminated electronic component 1, regions (for example, 130 μm×100 μm) at a plurality of locations (for example, five locations) are photographed with a SEM, the obtained SEM images are analyzed using image analysis software (for example, "Azo-kun" (registered trademark), manufactured by Asahi Kasei Engineering Cooperation), and circle-equivalent diameters of the metallic particles are obtained. The average of the obtained circle-equivalent diameters is regarded as the average of the metallic magnetic particles.

(Non-Magnetic Layer)

As shown in FIG. 2, in the laminated electronic component 1 according to the present embodiment, the body 2 includes a non-magnetic layer 23 present between the outer electrode 41 and a coil conductor opposing the outer electrode 41. Since the non-magnetic layer 23 is present between the outer electrode 41 and the coil conductor opposing the outer electrode 41, it is possible to improve the insulation between the outer electrode 41 and the coil conductor opposing the outer electrode 41. As a result, it is possible to inhibit occurrence of leak between the outer electrode and the coil conductor opposing the outer electrode. The non-magnetic layer 23 may contain a glass ceramic material, a non-magnetic ferrite material, or the like as a non-magnetic material. The non-magnetic layer 23 preferably contains a non-magnetic ferrite material as a non-magnetic material. As the non-magnetic ferrite material, a non-magnetic ferrite material having a composition, in which Fe is not less than about 40 mol % and not greater than about 49.5 mol % (i.e., from about 40 mol % to about 49.5 mol %) in terms of $Fe_2O_3$, Cu is not less than about 6 mol % and not greater than about 12 mol % (i.e., from about 6 mol % to about 12 mol %) in terms of CuO, and the balance is ZnO, may be used. To the non-magnetic material, $Mn_3O_4$, $Co_3O_4$, $SnO_2$, $Bi_2O_3$, $SiO_2$, or the like may be added as an additive as necessary, and the non-magnetic material may contain a small amount of unavoidable impurities. The non-magnetic layer 23 preferably contains Zn—Cu ferrite.

In the configuration shown in FIG. 2, the non-magnetic layer 23 is in contact with the coil conductor opposing the outer electrode 41. When the coil conductor opposing the outer electrode 41 is in contact with the non-magnetic layer 23, it is possible to further improve the direct current superposition characteristics of the laminated electronic component 1.

Figure 3:
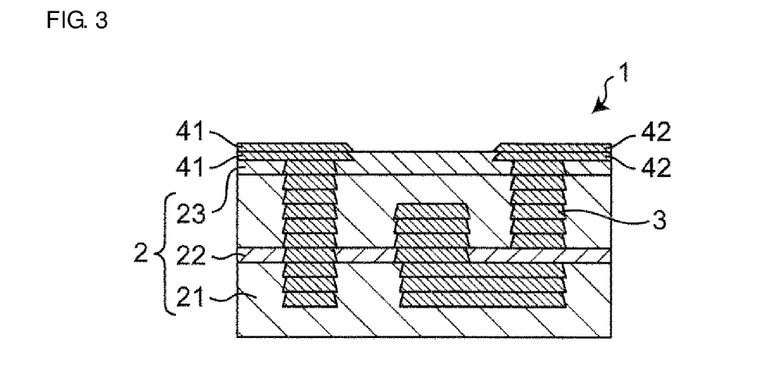
FIG. 3 is a cross-sectional view schematically showing the internal structure of a modification of the laminated electronic component according to the first embodiment.

FIG. 3 shows a cross-sectional view of a modification of the laminated electronic component 1 according to the present embodiment. In the configuration shown in FIG. 3, the non-magnetic layer 23 is in contact with the outer electrodes 41 and 42. Since the non-magnetic layer 23 is provided so as to be in contact with the outer electrodes 41 and 42, it is possible to improve direct current resistance between the outer electrodes 41 and 42.

The non-magnetic layer 23 may be provided at an intermediate position between a position in contact with the coil conductor opposing the outer electrode 41 and a position in contact with the outer electrodes 41 and 42. By providing the non-magnetic layer 23 at such a position, it is possible to improve the direct current superposition characteristics and the direct current resistance between the outer electrodes 41 and 42 in a balanced manner.

The non-magnetic layer 23 may contain a non-magnetic material such as Zn—Cu ferrite. The non-magnetic layer 23 preferably contains Zn—Cu ferrite.

The thickness of the non-magnetic layer 23 is preferably not less than about 5 μm and not greater than about 50 μm (i.e., from about 5 μm to about 50 μm).

When the thickness of the non-magnetic layer 23 is not less than about 5 μm, it is possible to further enhance the insulation between the outer electrode 41 and the coil conductor opposing the outer electrode 41. When the thickness of the non-magnetic layer 23 is not greater than about 50 μm, it is possible to make the inductance of the laminated electronic component 1 higher. The thickness of the non-magnetic layer 23 is more preferably not less than about 5 μm and not greater than about 30 μm (i.e., from about 5 μm to about 30 μm) and further preferably not less than about 5 μm and not greater than about 20 μm (i.e., from about 5 μm to about 20 μm).

The thickness of the non-magnetic layer 23 may be measured by a procedure described below. A sample of the laminated electronic component 1 is stood up vertically and a resin is cured around the sample. At this time, the LT plane is made exposed. Grinding the sample with a grinder is finished at a depth of about ½ in the W direction of the sample to expose a cross-section parallel to the LT plane. To eliminate sag of the internal conductor due to the grinding, the ground surface is processed by ion milling (ion milling apparatus IM4000, manufactured by Hitachi High-Tech Co., Ltd.) after the end of the grinding. A substantially central portion of the non-magnetic layer in the ground sample is photographed with a scanning electron microscope (SEM), and the thickness of the substantially central portion of the non-magnetic layer is measured from the obtained SEM photograph, and this thickness is defined as the thickness of the non-magnetic layer.

As shown in FIGS. 2 and 3, in the laminated electronic component 1 according to the present embodiment, the body 2 may include an additional non-magnetic layer in addition to the non-magnetic layer 23. In the configuration shown in FIGS. 2 and 3, the body 2 includes an additional non-magnetic layer 22 provided between coil conductors forming the coil 3. By providing the additional non-magnetic layer 22 between the coil conductors, the magnetic saturation characteristics of the laminated electronic component 1 improve, so that it is possible to further improve direct current superposition characteristics of the laminated electronic component 1. The additional non-magnetic layer 22 may contain a glass ceramic material, a non-magnetic ferrite material, or the like as a non-magnetic material. The additional non-magnetic layer 22 preferably contains a non-magnetic ferrite material as a non-magnetic material. As the non-magnetic ferrite material, a non-magnetic ferrite material having a composition, in which Fe is not less than about 40 mol % and not greater than about 49.5 mol % (i.e., from about 40 mol % to about 49.5 mol %) in terms of $Fe_2O_3$, Cu is not less than about 6 mol % and not greater than about 12 mol % (i.e., from about 6 mol % to about 12 mol %) in terms of CuO, and the balance is ZnO, may be used. To the non-magnetic material, $Mn_3O_4$, $Co_3O_4$, $SnO_2$, $Bi_2O_3$, $SiO_2$, or the like may be added as an additive as necessary, and the non-magnetic material may contain a small amount of unavoidable impurities. The additional non-magnetic layer 22 preferably contains Zn—Cu ferrite.

(Coil 3)

The coil 3 is provided within the body 2. The coil 3 may be formed from a conductive material such as Ag. A conductive paste may include a solvent, a resin, a dispersant, and the like in addition to the conductive material. Although the laminated electronic component 1 according to the present embodiment includes one coil 3 provided within the body 2 (see FIG. 1B and FIGS. 2 to 3, the configuration of the laminated electronic component according to the present disclosure is not limited to such a configuration, and the laminated electronic component may include a plurality of coils. In each of the configurations shown in FIGS. 2 to 3 the coil 3 is formed by connecting two upper and lower coil conductors between which the additional non-magnetic layer 22 is located. However, the configuration of the laminated electronic component 1 according to the present embodiment is not limited to such a configuration, and the laminated electronic component 1 may include a coil 3 formed by connecting three or more coil conductors in accordance with a desired inductance value or the like.

Each end portion of the coil 3 that is located at the top side of the body 2 is preferably electrically connected to an outer electrode via a connection portion provided outside a wound portion of the coil 3. By providing the connection portion as described above, it is possible to reduce the parasitic capacitance of the laminated electronic component 1, and thus it is possible to increase a resonant frequency.

(Outer Electrodes)

The laminated electronic component 1 according to the present embodiment includes the outer electrodes 41 and 42 that are provided on the bottom surface of the body 2 and that are each electrically connected to any one of the end portions of the coil 3. In the configuration shown in FIG. 1A, the outer electrodes 41 and 42 are provided only on the bottom surface of the body 2. However, the configuration of the laminated electronic component 1 according to the present embodiment is not limited to such a configuration, and the outer electrodes 41 and 42 may be each provided on the bottom surface of the body 2 and another side surface adjacent to the bottom surface. For example, the outer electrodes 41 and 42 may each be a substantially L-shaped electrode provided on the bottom surface of the body 2 and the WT plane adjacent to the bottom surface. The outer electrodes 41 and 42 may be formed from a conductive material such as Ag.

The side surfaces of the outer electrodes 41 and 42 each have a recessed wedge portion on a cross-section perpendicular to the bottom surface of the body 2, and a part of the body 2 enters the wedge portion. In addition, at the bottom surface of the body 2, at least parts of the surfaces of the outer electrodes 41 and 42 are located outward of the bottom surface of the body 2.

In the laminated electronic component 1 according to the present embodiment, since the outer electrodes 41 and 42 each have the above-described wedge portion, the adhesion between the outer electrodes 41 and 42 and the body 2 improves, and thus it is possible to have high joining strength therebetween. Furthermore, in the laminated electronic component 1 according to the present embodiment, at the bottom surface of the body 2, the outermost surface of each outer electrode is present outward of the bottom surface of the body 2, and thus the contactability between the laminated electronic component 1 and a mounting substrate or the like is improved when mounting the laminated electronic component. As described above, in the laminated electronic component 1 according to the present embodiment, it is possible to achieve desired adhesion and contactability of each outer electrode.

Figure 7:
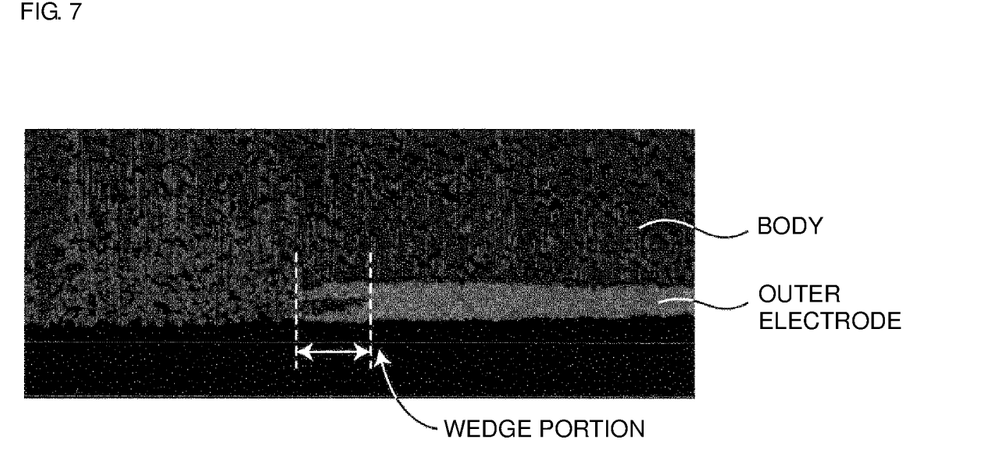
FIG. 7 is a SEM photograph showing a cross-sectional shape of a wedge portion of an outer electrode in the laminated electronic component according to the first embodiment.

FIG. 7 shows an example of the shape of the wedge portion provided to the outer electrode. FIG. 7 is a SEM photograph showing a cross-sectional shape of the wedge portion of the outer electrode in a cross-section perpendicular to the bottom surface of the body. As shown in FIG. 7, the outer electrode has a wedge portion that is recessed inward of the outer electrode. A part of the body enters the interior of the recessed shape of the wedge portion, the tip end of the body that enters the wedge portion has a sharp shape. Since a part of the body enters the wedge portion as described above, it is possible to improve adhesion between the body and the outer electrode, and it is possible to improve the joining strength between the body and the outer electrode. In addition, owing to a manufacturing process described later, the outermost surface of the outer electrode is present outward of the bottom surface of the body. Here, the entire surface of the outer electrode does not need to be present outward of the bottom surface of the body, and it is sufficient that at least a part of the surface of the outer electrode is present outward of the bottom surface of the body. Since at least a part of the surface (outermost surface) of the outer electrode is present outward of the bottom surface of the body as described above, it is possible to improve the contactability between the laminated electronic component and a mounting substrate or the like when mounting the laminated electronic component.

It is sufficient that the above-described wedge portion is provided to at least one side surface of the outer electrode. However, by providing a wedge portion to each side surface of the outer electrode, it is possible to further improve adhesion between the outer electrode and the body.

The length of the wedge portion is preferably not less than about 10 μm and not greater than about 50 μm (i.e., from about 10 μm to about 50 μm). When the length of the wedge portion is within the above-described range, it is possible to further improve adhesion between the outer electrode and the body. The method for measuring the length of the wedge portion will be described later.

The outer electrode may include a base electrode layer containing Ag, and one or more plating layers provided on the base electrode layer. In this case, the base electrode layer has the above-described wedge portion.

The thickness of the outer electrode is preferably not less than about 5 μm and not greater than about 100 μm (i.e., from about 5 μm to about 100 μm). The thickness of the outer electrode is more preferably not less than about 10 μm and not greater than about 50 μm (i.e., from about 10 μm to about 50 μm). When the thickness of the outer electrode is not less than about 5 μm, it is possible to improve solder corrosion resistance and thermal shock resistance. When the thickness of the outer electrode is not greater than about 100 μm and more preferably not less than about 50 μm (i.e., from about 50 μm to about 100 μm), it is possible to ensure a sufficient volume of the magnetic material portion, and thus it is possible to ensure good electrical characteristics.

The thickness of the outer electrode and the length of the wedge portion may be measured by procedures described below. A sample is ground by the same method as described above, and the outer electrode portion is photographed with a SEM. The thickness of the outer electrode and the length of the wedge portion are obtained from the obtained SEM photograph as described below. The thickness of a substantially central portion of the outer electrode is measured at one location and defined as the thickness of the outer electrode. In addition, for the length of the wedge portion, perpendicular lines are drawn from the tip end of the body that enters the wedge portion and the tip end of the outer electrode, respectively, as shown in FIG. 7. The distance between the perpendicular lines is defined as the "length of the wedge portion".

[Manufacturing Method for Laminated Electronic Component]

Next, the manufacturing method for the laminated electronic component 1 according to the present embodiment will be described below with reference to FIGS. 4A to 4G. However, the manufacturing method for the laminated electronic component 1 according to the present embodiment is not limited to the method described below. In each of FIGS. 4A to 4G, the right drawing is a top view of a multilayer body in each manufacturing process, and the left drawing and the central drawing are cross-sectional views taken along broken lines 1 and 2 shown in the top view, respectively.

The manufacturing method for the laminated electronic component 1 according to the present embodiment is a manufacturing method for a laminated electronic component including a body including a magnetic layer containing magnetic particles, a coil provided within the body, and outer electrodes provided on the surface of the body and each electrically connected to any one of end portions of the coil, the manufacturing method including the steps of preparing a multilayer body in which a coil is formed and which includes a magnetic layer; applying a conductive paste to a surface of the multilayer body to form a first outer electrode layer; applying a magnetic paste or a non-magnetic paste such that the magnetic paste or the non-magnetic paste is overlaid on at least a part of an outer edge portion of the first outer electrode layer, to form a magnetic paste layer or a non-magnetic paste layer; applying the conductive paste onto the first outer electrode layer to form a second outer electrode layer such that a part of the second outer electrode layer is overlaid on at least a part of an outer edge portion of the magnetic paste layer or the non-magnetic paste layer; and firing the multilayer body on which the first outer electrode layer, the magnetic paste layer or the non-magnetic paste layer, and the second outer electrode layer have been formed.

First, the multilayer body in which the coil is formed and which includes the magnetic layer is prepared by a procedure described below.

[Preparation of Magnetic Paste]

The magnetic paste is used for forming the magnetic layer 21. The magnetic paste contains a magnetic material. The magnetic paste may contain a binder, a solvent, a plasticizer, etc., in addition to the magnetic material.

(Magnetic Material)

As the magnetic material, particles of a metallic magnetic material (metallic magnetic particles), such as Fe, Co, Ni, and alloys containing these metals, or ferrite particles may be used. The magnetic material is preferably Fe or a Fe alloy. The Fe alloy is preferably a Fe—Si alloy, a Fe—Si—Cr alloy, a Fe—Si—Al alloy, a Fe—Si—B—P—Cu—C alloy, a Fe—Si—B—Nb—Cu alloy, or the like. The surfaces of the above-described metallic magnetic particles formed from the metallic magnetic material are preferably covered with an insulating coating. When the surfaces of the metallic magnetic particles are covered with an insulating coating, it is possible to enhance the insulation between the metallic magnetic particles. As a method for forming the insulating coating, a known sol-gel method, mechanochemical method, or the like may be used. The material forming the insulating coating is preferably an oxide of P, Si, or the like. In addition, the insulating coating may be an oxide film formed by oxidizing the surfaces of the metallic magnetic particles. The thickness of the insulating coating is preferably not less than about 1 nm and not greater than about 50 nm (i.e., from about 1 nm to about 50 nm), more preferably not less than about 1 nm and not greater than about 30 nm (i.e., from about 1 nm to about 30 nm), and further preferably not less than about 1 nm and not greater than about 20 nm (i.e., from about 1 nm to about 20 nm). The thickness of the insulating coating may be measured by photographing, with a scanning electron microscope (SEM), a cross-section obtained by grinding a sample of a laminated electronic component; and measuring the thickness of the insulating coating on the surface of the metallic magnetic particle from the obtained SEM photograph, as described above.

The average particle size of the metallic magnetic particles is preferably not less than about 1 μm and not greater than about 30 μm (i.e., from about 1 μm to about 30 μm), more preferably not less than about 1 μm and not greater than about 20 μm (i.e., from about 1 μm to about 20 μm), and further preferably not less than about 1 μm and not greater than about 10 μm (i.e., from about 1 μm to about 10 μm). Here, the "average particle size" of the metallic magnetic particles, which are a raw material, refers to a volume-based median diameter ($D_{50}$).

ZnO powder is added to the above-described metallic magnetic particles in an amount of about 0.2 to 2 wt % with respect to the sum of the metallic magnetic particles and the ZnO powder. Furthermore, a predetermined amount of a binder (ethyl cellulose resin or the like), a solvent (terpineol or the like), a plasticizer, etc., are added and kneaded, thereby preparing a magnetic paste. By adding a predetermined amount of ZnO powder to the metallic magnetic particles, it is possible to further enhance the insulation between the metallic magnetic particles.

[Preparation of Non-Magnetic Paste]

The non-magnetic paste is used for forming the non-magnetic layer 23 and the additional non-magnetic layer 22. The non-magnetic paste contains a non-magnetic material. The non-magnetic paste may contain a binder, a solvent, a plasticizer, etc., in addition to the non-magnetic material.

(Non-Magnetic Material)

As the non-magnetic material, a glass ceramic material, a non-magnetic ferrite material, or the like may be preferably used, but a non-magnetic ferrite material is preferably used. As the non-magnetic ferrite material, a non-magnetic ferrite material having a composition, in which Fe is not less than about 40 mol % and not greater than about 49.5 mol % (i.e., from about 40 mol % to about 49.5 mol %) in terms of $Fe_2O_3$, Cu is not less than about 6 mol % and not greater than about 12 mol % (i.e., from about 6 mol % to about 12 mol %) in terms of CuO, and the balance is ZnO, may be used. To the non-magnetic material, $Mn_3O_4$, $Co_3O_4$, $SnO_2$, $Bi_2O_3$, $SiO_2$, or the like may be added as an additive as necessary, and the non-magnetic material may contain a small amount of unavoidable impurities.

$Fe_2O_3$, ZnO, CuO, and the like are weighed to a predetermined ratio, wet-mixed, pulverized, and then dried. The obtained dried product is calcined at a temperature of not lower than about 700° C. and not higher than about 800° C. (i.e., from about 700° C. to about 800° C.) to prepare powder of a non-magnetic ferrite material. A predetermined amount of a solvent (a ketone-based solvent or the like), a binder (a polyvinyl acetal resin or the like), and a plasticizer (an alkyd-based plasticizer or the like) are added and kneaded with the non-magnetic ferrite material, thereby preparing a non-magnetic paste.

[Preparation of Conductive Paste]

The conductive paste is used for forming the coil 3 and the outer electrodes 41 and 42. The conductive paste contains a conductive material such as Ag powder. The conductive paste may contain a solvent, a resin, a dispersant, etc., in addition to the conductive material.

The Ag powder is prepared, and a predetermined amount of a solvent (eugenol (4-allyl-2-methoxyphenol) or the like), a resin (ethyl cellulose or the like), and a dispersant are added and kneaded therewith, thereby preparing a conductive paste. Here, the average particle size (volume-based median diameter $D_{50}$) of the Ag powder is preferably not less than about 1 μm and not greater than about 10 μm (i.e., from about 1 μm to about 10 μm). The same conductive paste may be used for the coil 3 and the outer electrodes 41 and 42, but conductive pastes having different compositions may be used therefor.

[Preparation of Body 2]

A heat release sheet and a PET (polyethylene terephthalate) film are stacked on a metal plate, and the magnetic paste is applied thereon and dried. The application and drying are repeated such that the thickness of the magnetic paste becomes a predetermined thickness, to form the magnetic layer 21 at the top side of the laminated electronic component.

Figure 4A:
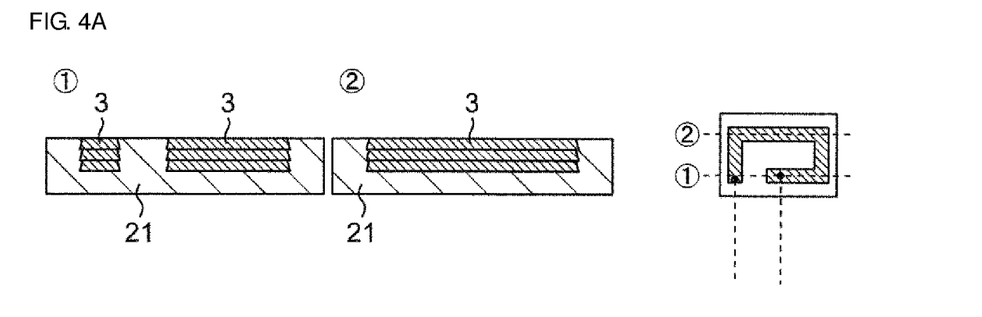
FIG. 4A is a schematic diagram illustrating a manufacturing method for the laminated electronic component according to the first embodiment.

The conductive paste is applied onto the above-described magnetic layer 21 to form a first coil conductor forming the coil 3. The applied conductive paste is dried, and then the magnetic paste is applied and filled around the first coil conductor and dried. The application and drying of the conductive paste and the magnetic paste are repeated such that the first coil conductor and the magnetic layer around the first coil conductor reach a predetermined thickness (FIG. 4A). In the example shown in FIG. 4A, the application and drying of the conductive paste and the magnetic paste are repeated three times.

Figure 4B:
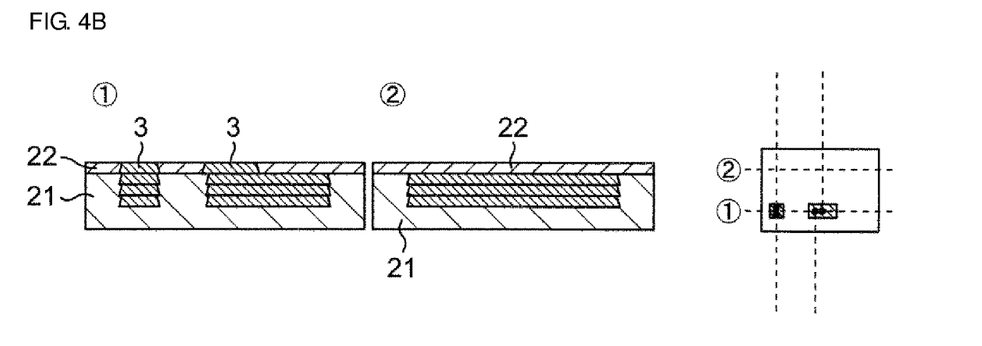
FIG. 4B is a schematic diagram illustrating the manufacturing method for the laminated electronic component according to the first embodiment.

In the case of forming a plurality of coil conductors within the body 2, a connection layer for connecting the first coil conductor and a second coil conductor to each other is formed on the first coil conductor by printing, and then the second coil conductor is formed. Specifically, the conductive paste is applied to predetermined positions on the first coil conductor to form the connection layer for connecting the first coil conductor and the second coil conductor to each other, and a connection portion for connecting the first coil conductor and an outer electrode to each other, and the connection layer and the connection portion are dried. The magnetic paste or the non-magnetic paste is applied and filled around the connection layer and the connection portion, and dried (FIG. 4B). In the example shown in FIG. 4B, the non-magnetic paste is applied around the connection layer and the connection portion to form the additional non-magnetic layer 22.

By repeating the same procedure as described above, n coil conductor layers and n−1 connection layers are stacked (n is an integer of 1 or greater).

Figure 4C:
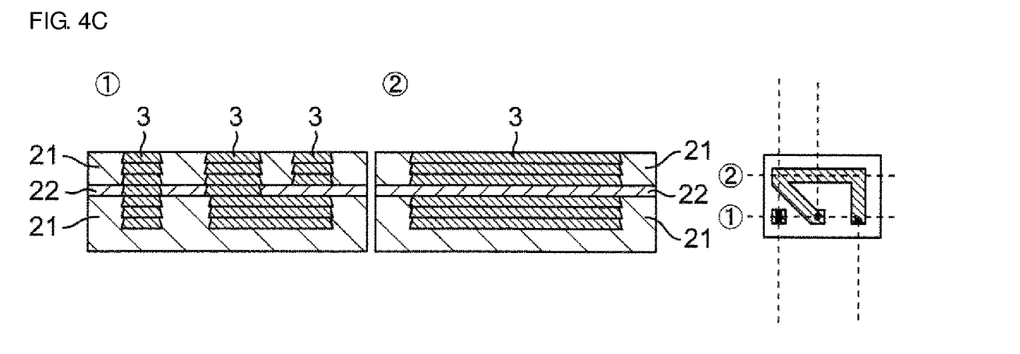
FIG. 4C is a schematic diagram illustrating the manufacturing method for the laminated electronic component according to the first embodiment.

In the case of forming a coil conductor after the second coil conductor, the conductive paste is applied to a predetermined position on the coil conductor to form a connection portion for connecting the coil conductor and an outer electrode to each other, and the connection portion is dried. In addition, a connection portion for connecting the first coil conductor and an outer electrode to each other is similarly formed and dried. Next, the magnetic paste is applied and filled around each formed connection portion, and dried. The application and drying of the conductive paste and the magnetic paste are repeated such that each coil conductor and each connection portion reach a predetermined thickness (FIG. 4C).

Figure 4D:
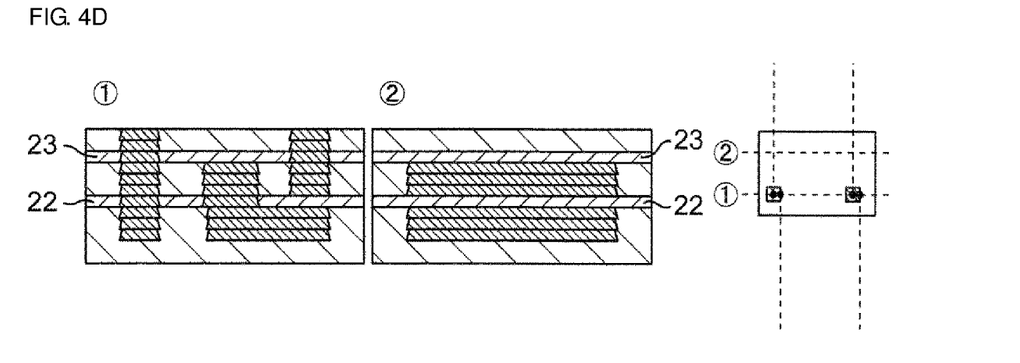
FIG. 4D is a schematic diagram illustrating the manufacturing method for the laminated electronic component according to the first embodiment.

After a predetermined number of coil conductors are formed, the start point and the end point of the coil 3 are extended to the bottom surface of the body 2 to form connection portions to be connected to outer electrodes. Specifically, the conductive paste is applied to the start point and the end point of the coil to form connection portions, and the connection portions are dried. The magnetic paste is applied and filled around the connection portions, and dried. The application and drying of the conductive paste and the magnetic paste are repeated such that the connection portions reach a predetermined thickness. As described above, when forming connection portions, the non-magnetic paste may be applied instead of the magnetic paste, for any of a plurality of layers of the magnetic paste to be applied around a connection portion pattern. One or more layers of the non-magnetic paste may be present (FIG. 4D). In the configuration shown in FIG. 4D, the non-magnetic layer 23 present between the outer electrode and the coil conductor opposing the outer electrode is provided. The non-magnetic layer 23 is formed such that the non-magnetic layer 23 is in contact with the coil conductor opposing the outer electrode. By the above procedure, a multilayer body in which a coil is formed and which includes a magnetic layer is prepared.

Figure 4E:
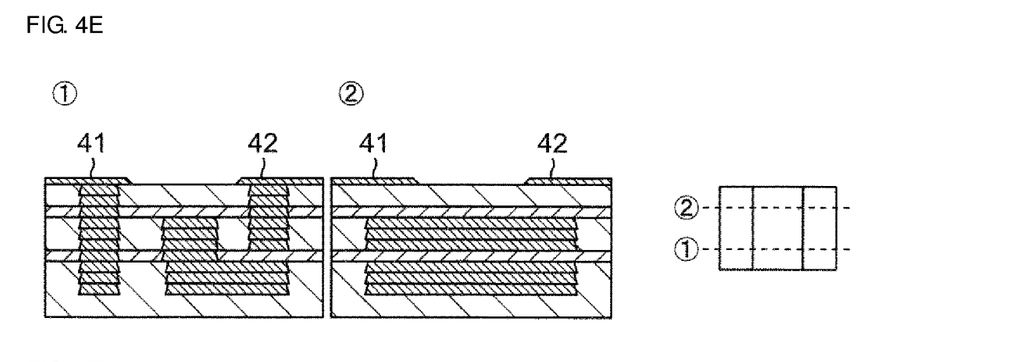
FIG. 4E is a schematic diagram illustrating the manufacturing method for the laminated electronic component according to the first embodiment.

Next, outer electrodes are formed. First, the conductive paste is applied to the surface of the multilayer body obtained by the above-described procedure, to form first outer electrode layers for forming the outer electrodes 41 and 42 (FIG. 4E). The surface of the multilayer body on which the outer electrodes are to be formed corresponds to the bottom surface of the body. The conductive paste is applied such that the conductive paste covers the respective connection portions exposed on the surface of the multilayer body, to form two outer electrode patterns, and the two outer electrode patterns are dried.

Figure 4F:
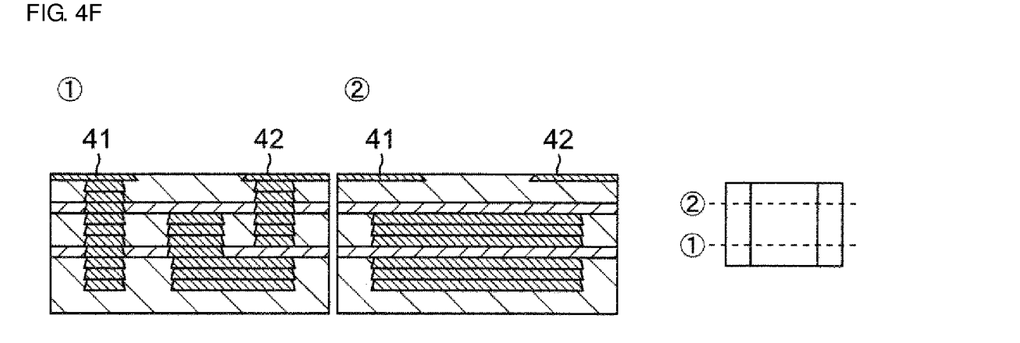
FIG. 4F is a schematic diagram illustrating the manufacturing method for the laminated electronic component according to the first embodiment.

Next, the magnetic paste or the non-magnetic paste is applied such that the magnetic paste or the non-magnetic paste is overlaid on at least a part of an outer edge portion of each first outer electrode layer, to form a magnetic paste layer or a non-magnetic paste layer (FIG. 4F). At this time, the magnetic paste or the non-magnetic paste is applied and filled around each first outer electrode layer, and dried. In the example shown in FIG. 4F, a magnetic paste layer is formed.

Figure 4G:
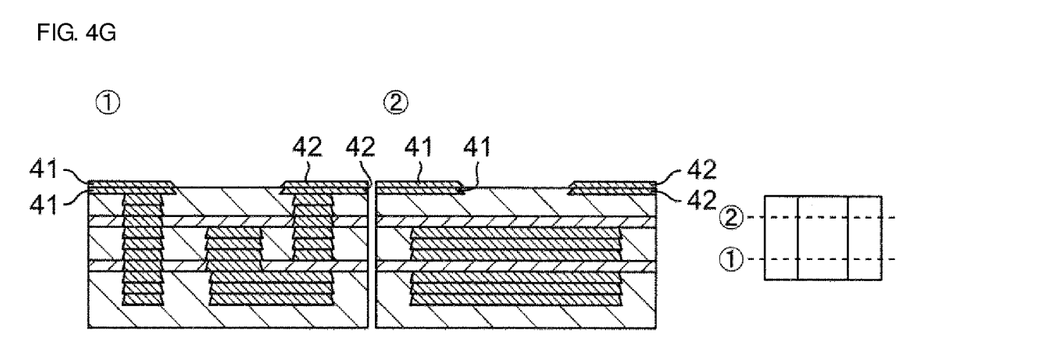
FIG. 4G is a schematic diagram illustrating the manufacturing method for the laminated electronic component according to the first embodiment.

Next, the conductive paste is applied onto the first outer electrode layers to form second outer electrode layers for forming the outer electrodes 41 and 42. The second outer electrode layers are formed such that parts of the second outer electrode layers are overlaid on at least parts of an outer edge portion of the magnetic paste layer or the non-magnetic paste layer (FIG. 4G). By forming the outer electrodes 41 and 42 as described above, it is possible to form wedge portions in the outer electrodes 41 and 42. In addition, by making the second outer electrode layers as the outermost layer of the multilayer body, the outermost surface of each outer electrode is present outward of the bottom surface of the body at the bottom surface of the body of the obtained laminated electronic component. As a result, in the obtained laminated electronic component, it is possible to achieve both improvement of adhesion between the body and each outer electrode and improvement of contactability when mounting.

In the manufacturing example shown in FIG. 4A to FIG. 4G, the outer electrodes 41 and 42 are each formed by stacking two outer electrode layers (the first outer electrode layer and the second outer electrode layer). However, the laminated electronic component according to the present disclosure and the manufacturing method therefor are not limited to such an embodiment, and each outer electrode may be formed by stacking three or more outer electrode layers. In the case of stacking n outer electrode layers (n is an integer of 3 or greater), the above-described application and drying of the conductive paste and the magnetic paste or the non-magnetic paste are repeated n−1 times, and then the conductive paste is finally applied and dried to form an nth outer electrode layer. As described above, by performing stacking such that the outermost layer of the multilayer body is the outer electrode layer, the outermost surface of each outer electrode is present outward of the bottom surface of the body in the obtained laminated electronic component. In addition, by stacking three or more outer electrode layers, it is possible to form an outer electrode having a plurality of wedge portions.

The multilayer body obtained as described above is separated from the metal plate by heating, and pressure-bonded, and then the PET film is separated from the multilayer body. In this manner, a multilayer body that is a collection of bodies is obtained.

Next, the obtained multilayer body is divided into individual pieces by a dicer or the like. Barrel processing is performed on each individualized multilayer body to round the corners of the multilayer body. Barrel processing may be performed before firing the multilayer body, or barrel processing may be performed on the fired bodies. The method of barrel processing may be either a dry method or a wet method, or may be a method of rubbing multilayer bodies together or a method of performing barrel processing together with a medium.

Next, each multilayer body subjected to barrel processing is baked. Each multilayer body is put in a baking furnace, and baked at a temperature of not lower than about 650° C. and not higher than about 750° C. (i.e., from about 650° C. to about 750° C.) to obtain a body having outer electrodes provided on a bottom surface thereof. The baked body is immersed into a resin (epoxy resin or the like) in a vacuum environment of not higher than about 1 Pa, to impregnate the body with the resin. The body impregnated with the resin is washed with a solvent (butyl carbitol acetate (2-(2-butoxyethoxy)ethyl acetate) and air-dried, and then the resin is cured at a temperature of not lower than about 100° C. and not higher than about 200° C. (i.e., from about 100° C. to about 200° C.). Thereafter, a Ni plating layer and a Sn plating layer are formed, by electroless plating, on the outer electrodes (base electrodes) formed on the surface of the body. In this manner, the laminated electronic component (laminated coil component) shown in FIG. 2 is obtained.

Although the manufacturing method for the laminated electronic component having one coil provided in a body has been described above, the laminated electronic component according to the present embodiment may include two or more coils. In this case as well, it is possible to manufacture the laminated electronic component by the same procedure as the method described above. In the case where the laminated electronic component is a coil component (coil array) having two coils stacked within a body, four coil ends (two coil end per coil) are extended to the bottom surface of the body and electrically connected to four outer electrodes formed on the bottom surface of the body, respectively, similar to the above-described configuration.

Second Embodiment

Next, a laminated electronic component according to a second embodiment of the present disclosure will be described below with reference to FIGS. 5A to 5C. The laminated electronic component according to the second embodiment is different from the laminated electronic component according to the first embodiment in that each outer electrode has a recess on a surface thereof that is in contact with the bottom surface of the body. Hereinafter, the different configuration will be described. Regarding the other points, the laminated electronic component according to the second embodiment has the same configuration as in the first embodiment, and the description thereof is omitted. In the laminated electronic component according to the second embodiment, since each outer electrode has, in addition to the above-described wedge portion, a recess on the surface thereof that is in contact with the bottom surface of the body, it is possible to further improve adhesion between the outer electrode and the body, so that it is possible to achieve high joining strength.

Figure 5A:
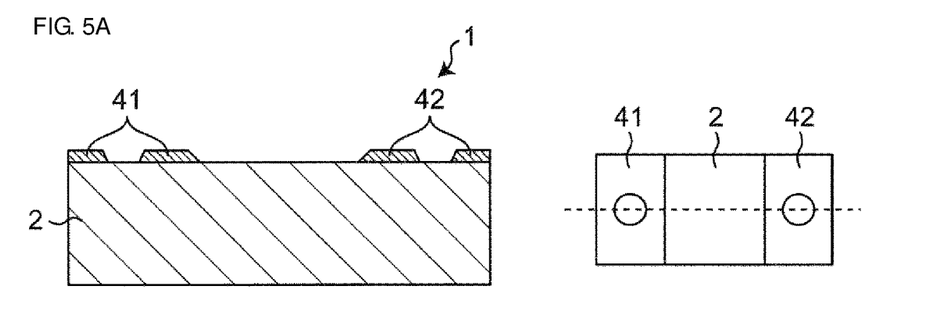
FIG. 5A is a schematic diagram illustrating a manufacturing method for a laminated electronic component according to a second embodiment of the present disclosure.
Figure 5B:
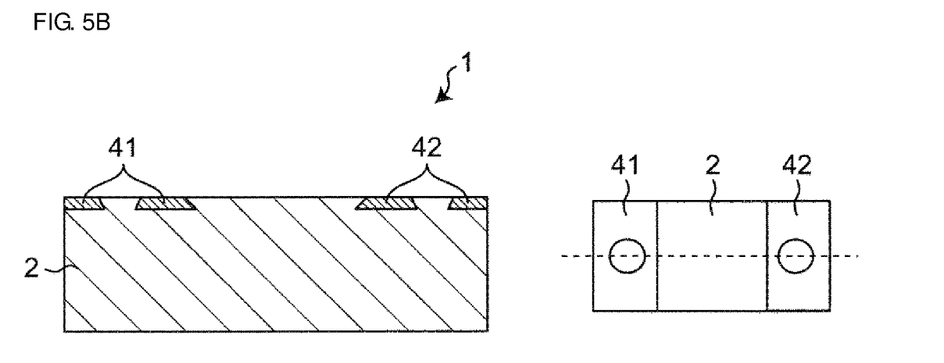
FIG. 5B is a schematic diagram illustrating the manufacturing method for the laminated electronic component according to the second embodiment.
Figure 5C:
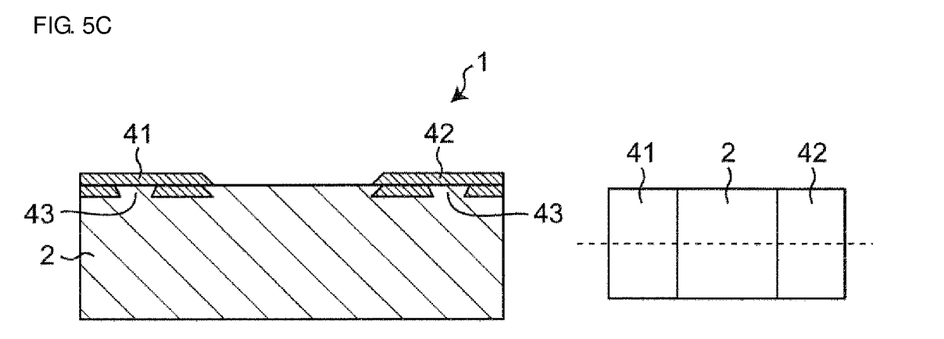
FIG. 5C is a schematic diagram illustrating the manufacturing method for the laminated electronic component according to the second embodiment.

FIGS. 5A to 5C illustrate a method for forming the outer electrodes 41 and 42 in a manufacturing method for the laminated electronic component 1 according to the second embodiment. In FIGS. 5A to 5C, a coil provided within the body is omitted. In addition, in each of FIGS. 5A to 5C, the right drawing is a top view of a multilayer body in each manufacturing process, and the left drawing is a cross-sectional view, parallel to the LT plane, of the multilayer body. First, as shown in FIG. 5A, a conductive paste is applied to the multilayer body to form first outer electrode layers. In a step of forming the first outer electrode layers, the conductive paste is applied such that each first outer electrode layer has a cavity at the inner side thereof in a plan view. In the example shown in FIG. 5A, each first outer electrode layer has one circular cavity, but the shape and the number of cavities are not limited thereto and may be adjusted as appropriate.

Next, in a step of forming magnetic paste layers or non-magnetic paste layers, a magnetic paste or a non-magnetic paste is applied such that the magnetic paste or the non-magnetic paste fills the cavities and is overlaid on the first outer electrode layers around the cavities (FIG. 5B). By applying the magnetic paste or the non-magnetic paste as described above, the width of the recess formed in each outer electrode becomes smaller at the inlet end of the recess than within the recess.

Next, in a step of forming second outer electrode layers, the second outer electrode layers are formed so as to cover the magnetic paste or the non-magnetic paste filled in the cavities (FIG. 5C). By firing a multilayer body on which the first outer electrode layers, the magnetic paste layers or the non-magnetic paste layers, and the second outer electrode layers have been formed as described above, it is possible to obtain the laminated electronic component according to the second embodiment.

In the laminated electronic component according to the second embodiment, the outer electrodes 41 and 42 each have, on the surface thereof that is in contact with the bottom surface of the body 2, a recess 43 recessed inward from the surface. A part of the body 2 enters each recess 43. The width of the recess 43 is smaller at the inlet end of the recess 43 than within the recess 43. In the configuration in which the outer electrodes 41 and 42 each have the recess 43 as described above and a part of the body 2 enters each recess 43, the part of the body 2 that enters each recess 43 serves as an anchor portion that improves adhesion between the outer electrodes 41 and 42 and the body 2. Therefore, by adopting the above configuration, it is possible to further enhance adhesion between each outer electrode and the body. The number and shape of recesses formed on each outer electrode are not particularly limited and may be adjusted as appropriate in accordance with desired characteristics.

Third Embodiment

Figure 6A:
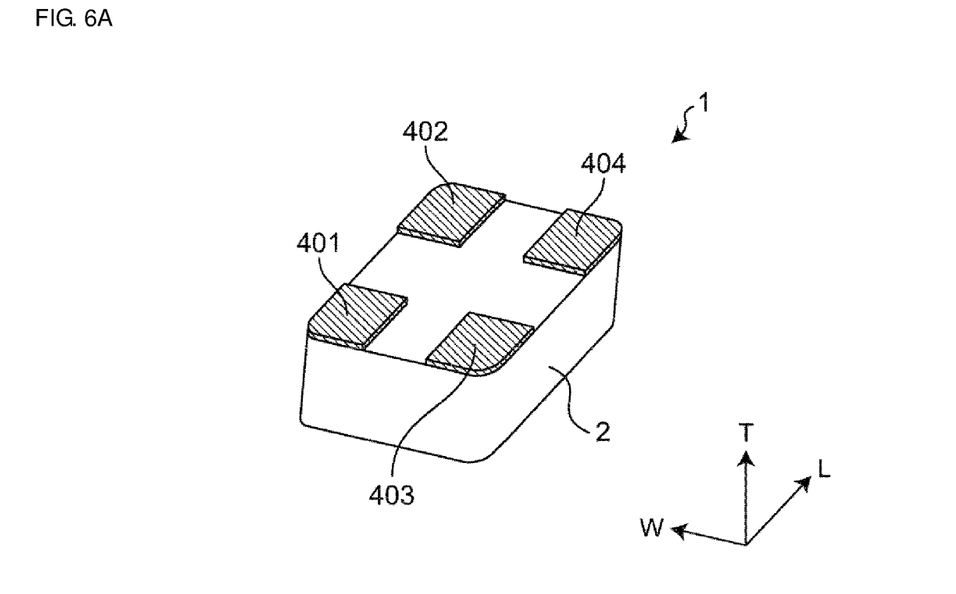
FIG. 6A is a perspective view of a laminated electronic component according to a third embodiment of the present disclosure, as seen from the bottom side.
Figure 6B:
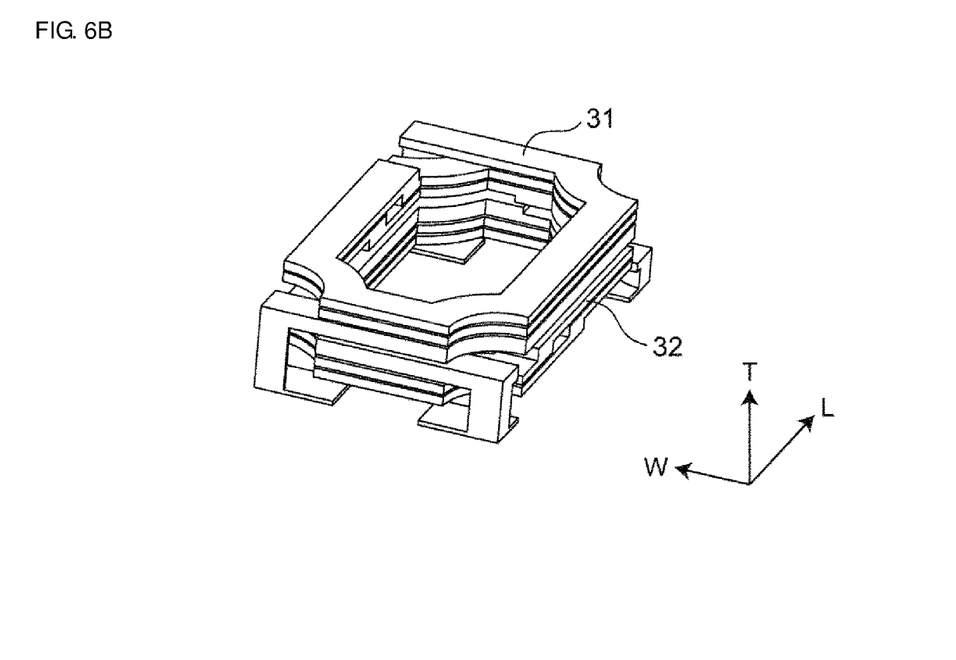
FIG. 6B is a perspective view schematically showing the shape of a coil provided within the laminated electronic component according to the third embodiment.

Next, a laminated electronic component according to a third embodiment of the present disclosure will be described below with reference to FIGS. 6A and 6B. The laminated electronic component according to the third embodiment is different from the laminated electronic component according to the first embodiment in that a coil includes a first coil 31 and a second coil 32, and outer electrodes include a first outer electrode 401, a second outer electrode 402, a third outer electrode 403, and a fourth outer electrode 404 each of which is electrically connected to any one of end portions of the first coil and the second coil. Also in the case where the laminated electronic component includes two or more coils and four (two pairs of) or more outer electrodes connected to the respective end portions of the coils as described above, by providing a non-magnetic layer between an outer electrode and a coil conductor opposing the outer electrode, it is possible to improve the insulation between the outer electrode and the coil conductor opposing the outer electrode. As a result, it is possible to inhibit occurrence of leak between the outer electrode and the coil conductor opposing the outer electrode.

The present disclosure includes the following aspects, but is not limited to these aspects.

(Aspect 1)

A laminated electronic component including a body including a magnetic layer containing magnetic particles; a coil provided within the body; and outer electrodes provided on a bottom surface of the body and each electrically connected to any one of end portions of the coil. The coil is formed by connecting a plurality of coil conductors stacked within the body, and the body includes a non-magnetic layer present between the outer electrode and the coil conductor opposing the outer electrode.

(Aspect 2)

The laminated electronic component according to aspect 1, wherein the non-magnetic layer is in contact with the coil conductor opposing the outer electrode.

(Aspect 3)

The laminated electronic component according to aspect 1, wherein the non-magnetic layer is in contact with the outer electrode.

(Aspect 4)

The laminated electronic component according to any one of aspects 1 to 3, wherein in a cross-section perpendicular to the bottom surface of the body, a side surface of each outer electrode has a recess-shaped wedge portion, and a part of the body enters the wedge portion, and at the bottom surface of the body, at least a part of a surface of each outer electrode is located outward of the bottom surface of the body.

(Aspect 5)

The laminated electronic component according to any one of aspects 1 to 4, wherein the non-magnetic layer contains a Zn—Cu ferrite material.

(Aspect 6)

The laminated electronic component according to any one of aspects 1 to 5, wherein the body further includes an additional non-magnetic layer between the plurality of coil conductors.

(Aspect 7)

The laminated electronic component according to aspect 6, wherein the additional non-magnetic layer contains a Zn—Cu ferrite material.

(Aspect 8)

The laminated electronic component according to any one of aspects 1 to 7, wherein a thickness of the non-magnetic layer is not less than about 5 µm and not greater than about 50 µm (i.e., from about 5 µm to about 50 µm).

The laminated electronic component according to the present disclosure has high reliability and thus is usable for electronic devices in a wide range of fields.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A laminated electronic component comprising:
   a body including a magnetic layer containing magnetic particles;
   a coil provided within the body; and
   outer electrodes provided on a bottom surface of the body and each electrically connected to any one of end portions of the coil, wherein
   the coil is formed by connecting a plurality of coil conductors stacked within the body,
   the body includes a non-magnetic layer present between one of the outer electrodes and one of the coil conductors opposing the one of the outer electrodes, the non-magnetic layer extending entirely across the body, and
   one of the coil conductors of the coil is in the non-magnetic layer and is exposed at a surface of the non-magnetic layer opposite to a surface of the non-magnetic layer facing the bottom surface of the body, such that an exposed portion of the one of the coil conductors is in direct contact with another one of the coil conductors of the coil that is external to the non-magnetic layer that extends entirely across the body.

2. The laminated electronic component according to claim 1, wherein the non-magnetic layer is in contact with the one of the coil conductors opposing the one of the outer electrodes.

3. The laminated electronic component according to claim 1, wherein the non-magnetic layer is in contact with the one of the outer electrodes.

4. The laminated electronic component according to claim 1, wherein
   in a cross-section perpendicular to the bottom surface of the body, a side surface of each outer electrode has a recess-shaped wedge portion, and a part of the body enters the wedge portion, and
   at the bottom surface of the body, at least a part of a surface of each outer electrode is located outward of the bottom surface of the body.

5. The laminated electronic component according to claim 1, wherein the non-magnetic layer contains a Zn—Cu ferrite material.

6. The laminated electronic component according to claim 1, wherein the body further includes an additional non-magnetic layer between the plurality of coil conductors.

7. The laminated electronic component according to claim 6, wherein the additional non-magnetic layer contains a Zn—Cu ferrite material.

8. The laminated electronic component according to claim 1, wherein a thickness of the non-magnetic layer is from about 5 µm to about 50 µm.

9. The laminated electronic component according to claim 2, wherein
   in a cross-section perpendicular to the bottom surface of the body, a side surface of each outer electrode has a recess-shaped wedge portion, and a part of the body enters the wedge portion, and
   at the bottom surface of the body, at least a part of a surface of each outer electrode is located outward of the bottom surface of the body.

10. The laminated electronic component according to claim 3, wherein
    in a cross-section perpendicular to the bottom surface of the body, a side surface of each outer electrode has a recess-shaped wedge portion, and a part of the body enters the wedge portion, and
    at the bottom surface of the body, at least a part of a surface of each outer electrode is located outward of the bottom surface of the body.

11. The laminated electronic component according to claim 2, wherein the non-magnetic layer contains a Zn—Cu ferrite material.

12. The laminated electronic component according to claim 3, wherein the non-magnetic layer contains a Zn—Cu ferrite material.

13. The laminated electronic component according to claim 4, wherein the non-magnetic layer contains a Zn—Cu ferrite material.

14. The laminated electronic component according to claim 2, wherein the body further includes an additional non-magnetic layer between the plurality of coil conductors.

15. The laminated electronic component according to claim 3, wherein the body further includes an additional non-magnetic layer between the plurality of coil conductors.

16. The laminated electronic component according to claim 4, wherein the body further includes an additional non-magnetic layer between the plurality of coil conductors.

17. The laminated electronic component according to claim 5, wherein the body further includes an additional non-magnetic layer between the plurality of coil conductors.

18. The laminated electronic component according to claim 2, wherein a thickness of the non-magnetic layer is from about 5 µm to about 50 µm.

19. The laminated electronic component according to claim 3, wherein a thickness of the non-magnetic layer is from about 5 µm to about 50 µm.

20. The laminated electronic component according to claim 1, wherein
the exposed portion of the one of the coil conductors is aligned with the surface of the non-magnetic layer.

* * * * *